United States Patent Office 3,094,497
Patented June 18, 1963

3,094,497
CONDENSATION CATALYSTS
James Franklin Hyde, Midland, Mich., assignor to Dow Corning Corporation, Midland, Mich., a corporation of Michigan
No Drawing. Filed July 28, 1960, Ser. No. 45,811
7 Claims. (Cl. 260—18)

This invention relates to the use of amine salts as catalysts for the cocondensation of silicon-bonded hydroxyl groups and silicon-bonded oxyorganic groups.

One object of this invention is to provide a new method for cocondensing silicon-bonded hydroxyl groups and silicon-bonded oxyorganic groups. Another object is to provide such a cocondensation system in which there is no SiOSi bond rearrangement. Another object is to provide a new curing system employing an amine salt as a catalyst. Another object is to provide such a system which is operative at room temperature.

This invention relates to the method which comprises contacting (A) an organosilicon compound containing as functional groups both silicon-bonded hydroxyl radicals and silicon-bonded —OR' radicals, each R' radical being a monovalent radical selected from the group consisting of hydrocarbon radicals and hydrocarbon radicals containing functions selected from the group consisting of ether linkages, aromatic halogen atoms, nitrile groups, hydroxyl groups and aliphatic fluorine atoms, the last being separated from any silicon atom by at least three atoms, there being less than eleven total carbon atoms and etheral oxygen atoms in each R', the remaining silicon valences in said organosilicon compound being satisfied by radicals selected from the group consisting of silicon-bonded oxygen atoms, hydrocarbon radicals and hydrocarbon radicals containing functions selected from the group consisting of ether linkages, aromatic halogen atoms, nitrile groups, hydroxyl groups and aliphatic fluorine atoms, the last being separated from any silicon atom by at least three atoms, with (B) a composition compatible with (A) and selected from the group consisting of (1) a salt of a phosphoric acid, the only active hydrogen atoms in said acid being attached to the phosphorus through an oxygen atom, and a basic amino compound, any active hydrogen in said amino compound being attached to nitrogen and any remaining nitrogen valences being satisfied by carbon atoms, the total number of carbon atoms in (1) being at least 18, and (2) a salt of a carboxylic acid, the only active hydrogen in said carboxylic acid being a part of carboxyl groups attached only to carbon atoms, and a basic amino compound, any active hydrogen in said amino compound being attached to nitrogen and any remaining nitrogen valences being satisfied by carbon atoms, the total number of carbon atoms in (2) being at least 6, whereby the silicon-bonded hydroxyl radicals in (A) condense with the silicon-bonded —OR' radicals in (A) to form siloxane linkages producing HOR' as a by-product.

The organosilicon compound can be any silane, siloxane or silcarbane or any mixture thereof in which the only functional groups attached directly to any silicon atom are both hydroxyl and —OR' groups. The silicon valences not satisfied by the functional groups can be satisfied by any groups which do not interfere with the condensation of silicon-bonded hydroxyl groups with silicon-bonded —OR' groups. Thus, the silicon valences can be satisfied by oxygen atoms attached to other silicon atoms to form siloxane linkages, monovalent hydrocarbon radicals, hydrocarbon radicals which are polyvalent, i.e. which have a valence higher than one, each valence of which is attached to another silicon atom to form silcarbane linkages and similar monovalent and polyvalent hydrocarbon radicals containing such functions as ether linkages, aromatic halogen atoms, aliphatic fluorine atoms, hydroxyl groups and nitrile groups. Any aliphatic fluorine atoms should be separated from any silicon atom by at least three carbon atoms.

More specifically, the silicon valences of the organosilicon compound employed in this invention can be satisfied by any monovalent radical R which can be a hydrocarbon radical, for example, any alkyl radical such as the methyl, ethyl, isopropyl, tert-butyl, 2-ethylhexyl, dodecyl, octadecyl and myricyl radicals; any alkenyl radical such as the vinyl, allyl and hexadienyl radicals; any cycloalkyl radical such as the cyclopentyl and cyclohexyl radicals; any cycloalkenyl radical such as the cyclopentenyl and cyclohexenyl radicals; any aryl hydrocarbon radical such as the phenyl, naphthyl and xenyl radicals; any aralkyl radical such as the benzyl, phenylethyl and xylyl radicals and any alkaryl radical such as the tolyl and dimethylphenyl radicals. The R radicals can also be monovalent hydrocarbon radicals containing aromatic halogen atoms as, for example, in the 2,4,6-trichlorobenzyl, perchlorophenyl, 2-bromonaphthyl, p-iodo-phenylethyl and 4-fluorophenyl radicals; aliphatic fluorine atoms as, for example, in the 3,3,3-trifluoropropyl, α,α,α-trifluorotolyl, 3,3,4,4,5,5,5-heptafluoropentyl and 5,5,5-trifluoro-2-trifluoromethylamyl radicals; hydroxyl radicals as, for example, in the 4-ethyl-4-hydroxyhexyl, 3-hydroxyallyl, cresyl, p-hydroxyphenyl and

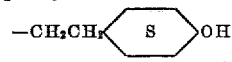

radicals; nitrile radicals as, for example, in the gamma-cyanopropyl and beta-cyanoethyl radicals and ether linkages as, for example, in the

—CH$_2$CH$_2$OCH$_3$

—CH$_2$CH$_2$OCH$_2$CH$_3$

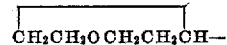

—CH$_2$(OCH$_2$CH$_2$)$_2$OCH$_3$, —CH$_2$OCH$_2$CH=CH$_2$ and furyl radicals. These R radicals can contain more than one of the above functions in radicals such as, for example, —CH$_2$CH$_2$CH$_2$CH$_2$CHOHCH$_2$OCH$_3$,

—CH$_2$CH$_2$OCF$_2$CF$_3$

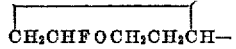

and

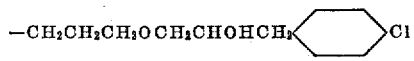

These silicon valences can also be satisfied by polyvalent hydrocarbon radicals R" attached to other silicon atoms. These polyvalent hydrocarbon radicals can contain singly or in any combination such polyvalent groups as methylene, vinylene, vinylidene, cyclohexylidene, phenylene, tolylene, toluenyl, toluylene, tertiary carbon atoms, and quaternary carbon atoms as well as any monovalent hydrocarbon radicals. These polyvalent hydrocarbon radicals can contain the various functions permissible in the monovalent radicals as previously described. Examples of operative polyvalent hydrocarbon radicals R" containing such functions include

—CH$_2$(OCH$_2$CH$_2$)$_6$OCH$_2$CH$_2$CH$_2$—

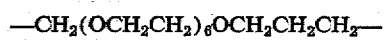

—CH$_2$CH$_2$CHFCH$_2$CH$_2$—, iodophenylene and

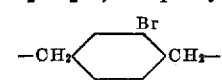

The organosilicon composition employed in this invention must contain both silicon-bonded hydroxyl radicals and R' radicals attached to silicon through silicon-oxygen-carbon linkages. The R' radicals can be any of the monovalent radicals set forth above for R above with the exception that in any R' radical the total number of carbon atoms and ethereal oxygen atoms, if any, cannot exceed ten. When the R' radicals are larger than this, the rate of SiOH—SiOR' condensation at room temperature is not practical.

Thus, where R represents any of the above-described monovalent radicals and R'' represents any of the above-described polyvalent radicals, the organosilicon compound employed as a starting material can contain, for example, any one or any combination of the following molecular species or can contain any one or any combination of the following types of polymer units:

$R_3Si(OH)$, $R_3SiOR'$, $R_2Si(OH)_2$, $R_2Si(OR')_2$,
$RSi(OR')_3$, $Si(OR')_4$, $R_2Si(OH)(OR')$,
$RSi(OR')_2OH$, $Si(OR')_3(OH)$, $(R'O)_3SiOSi(OR')_3$,
$(R'O)_2SiROSiR_2OH$, $HOSiR_2OSiR_2OH$,
$R_3SiR''Si(OH)_3$, $R_3SiR''SiR_2OR'$,
$HOR_2SiR''SiR(OH)_2$, $R'OSiR_2—R''—SiR_2OR'$
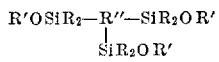

$R_3SiO_{0.5}$, $R_2SiO$, $RSiO_{1.5}$, $SiO_2$,
$R_2Si(OH)O_{0.5}$, $RSi(OR')O$, $RSi(OR')_2O_{0.5}$,
$Si(OR')_2O$, $Si(OR')_3O_{0.5}$, $SiR(OH)_2O_{0.5}$,
$O_{0.5}R_2SiR''SiR_2O_{0.5}$ and the like.

In any one molecule of the organosilicon compound there must be at least one silicon-bonded functional group, i.e. a hydroxyl or —OR' radical. While the above list does not include all the possible variations, it is sufficiently representative to show the scope of the materials which can be employed in this invention.

The method of this invention is especially advantageous for producing polysiloxane fluids, elastomeric gums and resins. Functionally endblocked linear molecules, i.e. diorganopolysiloxanes, can be polymerized without bond rearrangement by the condensation of the terminal silicon-bonded functional groups. If organosilyl endblocking is desired, the necessary proportion of triorganosilanol or other organosilicon compound containing one silicon-bonded —OR' group per molecule can be added to condense with the respective silicon-bonded —OR' or hydroxyl groups on the polymer. If polyfunctionality is desired, the necessary organosilicon compound containing more than two silicon-bonded groups per molecule, e.g. $RSi(OR'_3)_3$, $R'OSiR_2OSiROSiR_2OR'$
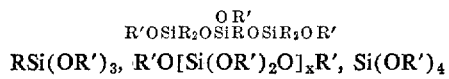

$RSi(OR')_3$, $R'O[Si(OR')_2]_xR'$, $Si(OR')_4$ or $R'O(SiR_2O)_5Si(OR')_2O(SiR_2O)_5R'$ can be added to condense with the terminal silicon-bonded hydroxyl groups on the polymer. Alternatively, the polymer can be —OR' endblocked and polyfunctionality can be introduced with a polyhydroxylated organosilicon compound, e.g. $RSi(OH)_3$, $HOSiR_2OSi(OH)ROSiR_2OH$ or $HO(SiR_2O)_5Si(OH)_2O(SiR_2O)_5H$ Siloxane elastomeric gum molecules, i.e. molecules generally having an average of about 2 R radicals per silicon atom, and siloxane resin molecules, i.e. molecules generally having an average of from 1 up to about 2 R radicals per silicon atom, which contain both silicon-bonded hydroxyl groups and silicon-bonded —OR' groups can be cured by the method of this invention.

The preferred embodiment of this invention is the method employing as the organosilicon composition a mixture of two components, one of which comprises organopoly siloxanes having at least two silicon-bonded hydroxyl groups per molecule and the other of which comprises polyfunctional silicate compounds having at least three and preferably more silicon-bonded —OR' groups per molecule. The organopolysiloxane component can be a resin having an R/Si ratio of from 1 to 1.9 or a linear gum having an R/Si ratio of about 2, e.g. 1.99 to 2. If the organopolysiloxane component is a resin, the R groups are preferably methyl and phenyl radicals such that the phenyl to silicon ratio for the organopolysiloxane component ranges from 0.25:1 to 1.5:1. Such resins inherently have good coating properties. While there can be some SiOR' groups present, it is preferable that they be at a minimum in order to better control the ultimate resin structure. If the organopoly-siloxane component is a linear polymer gum, the R groups are preferably methyl, phenyl, vinyl and 3,3,3-trifluoropropyl radicals. Such linear organopolysiloxanes preferably contain from about 150 to about 10,000 siloxane units for the best ultimate physical properties, but these limits are not critical to the method of this invention.

The polyfunctional silicate compounds can be composed entirely of molecules made up of units of the formula $R(R'O)_3Si$ and solvent-soluble partial hydrolyzates such as $R(R'O)_2SiO[SiR(OR')O]_xSiR(OR')_2$ and $R(R'O)_2SiOSiR[OSiR(OR')_2]_2$. However, it is preferable that the silicate component be composed of molecules consisting essentially of units of the formula $$(R'O)_mSiO_{\frac{4-m}{2}}$$

in which R' is as above defined and each m can be 2, 3 or 4. This formula represents both orthosilicates and polysilicates. In this specification, the term "orthosilicate" represents a composition of the formula $(R'O)_4Si$. The term "polysilicate" represents compositions having such configurations as, for example, $(R'O)_3SiOSi(OR')_3$, $[Si(OR')_2O]_y$ where y is at least 3

$Si(OR')_2OSi(OR')_3$
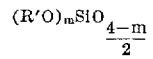

$(R'O)_3SiOSi(OR')OSi(OR')_3$, and $(R'O)_3SiO)[Si(OR')_2O]_xSi(OR')_3$ where x is at least 1. The polysilicates operative in this invention are solvent-soluble partial hydrolyzates of the orthosilicates.

Mixtures of the orthosilicates, trifunctional silanes and their partial hydrolyzates are operative as well as cohydrolyzates of these materials. Examples of such cohydrolyzates include $(R'O)_2RSiOSi(OR')_3$, $Si(OR')_3$
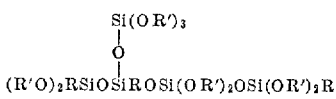

$(R'O)_2RSiOSiROSi(OR')_2OSi(OR')_2R$ $(R'O)_2RSiO[Si(OR')_2O]_xSiR(OR')_2$ and
$(R'O)_2RSiO[Si(OR')_2O]_xSi(OR')_3$ in which x is at least 1.

The crux of this invention resides in the discovery that certain amine salts catalyze the cocondensation of silicon-bonded hydroxyls with silicon-bonded —OR' radicals. The amine salts are reaction products of basic amino compounds, i.e. ammonia or organic amines (including silylorganic amines), with phosphoric acids or carboxylic acids.

More specifically, the basic amino compound can be ammonia, a primary amine, a secondary amine or a tertiary amine. The amine can contain one or more amino groups and can also contain carbon-bonded silicon atoms and other functional organic groups which are free of active hydrogen. It is necessary that the only active hydrogen atoms, if any, be attached to nitrogen atoms. Any other active hydrogen atoms would interfere with the salt formation. The amino compound can, however, contain various non-interfering functional groups as shown in the following examples.

In short, the term "basic amino compound" means compounds containing at least one nitrogen atom attached to no more than three carbon atoms none of which are part of carbonyl, sulfonyl or nitrile groups, any remaining nitrogen valences being satisfied by hydrogen atoms.

Specific examples of operative amines are: o-aminoacetanilide, iminodiacetonitrile, m-aminoacetophenone, allylamine, N-methylallylamine, amylamine, N,N-dimethylamylamine, aniline, p-bromoaniline, 2,6-dinitroaniline, m-fluoroaniline, sym-bis-gamma-aminopropyltetramethyl-disiloxane, gamma(N-aminoethylamino)propyldiphenylmethylsilane, o-iodoaniline, o-nitroaniline, 2,3,4,5-tetrachloroaniline, o-anisidine, 9-anthrylamine, 4,4'-diaminoazobenzene, anthranilonitrile, benzylamine, p-methoxybenzylamine, decylamine, diallylamine, dicyclohexylamine, diethylenetriamine, difurfurylamine, di-m-tolylamine, β-ethoxyethylamine, tetrahydrofurfurylamine, tetramethylguanidine, histamine, benzylhydrazine, p-bromophenylhydrazine, 1-methyl-1-phenylhydrazine, 4,4-diaminohydrazobenzene, $p_3$-leucaniline, methylamine, morpholine, 5-nitronaphthylamine, 1,2-dimethyl-4-pentenylamine, N,N-diethyl-p-phenylenediamine, piperazine, piperidine, 2-aminopyridine, 6-nitro-o-toluidine, 2-amino-p-tolunitrile, 9-phenanthrylamine, and tribenzylamine.

As stated above the salts which are operative catalysts in this invention are the reaction products of any of the basic amino compounds described above, i.e. ammonia and primary, secondary and tertiary amines, both organic and silylorganic, with either a phosphoric or a carboxylic acid in which any carboxyl group is attached to a carbon atom. As in the basic amino compounds where any active hydrogen atoms are attached to nitrogen atoms, so in the acids any active hydrogen atoms must be a part of the particular acid group, e.g. RCOOH, O=P(OH)$_3$ or

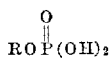

An "active hydrogen" atoms is one which forms methane when a compound containing said "active hydrogen" is reacted with methyl magnesium iodide at room temperature.

The salts employed in any particular system must be compatible in that system. The degree of compatibility of any salt in any system generally depends on the total number of carbon atoms and silicon atoms and their configuration in the salt to be employed. Thus, for example, in a given system the n-hexylamine salt of octanoic acid is compatible while the di-n-hexylamine salt of succinic acid is incompatible. However, the di-eicosylamine salt of succinic acid is compatible in that system. Similarly, the mono-2-ethylhexyl amine salt of phenylphosphoric acid is compatible in a given system whereas it is necessary to go to the mono-eicosylamine salt of unsubstituted phosphoric acid to achieve compatibility in the same system. For any particular system suitable salts can be selected on the basis of compatibility.

The most compatible and therefore preferred salts are monocarboxylic acid salts which have at least six carbon atoms. Examples of the monocarboxylic acid which can be used in the preparation of these salts include the following: abietic acid, acetic acid, cyanoacetic acid, phenoxyacetic acid, acrylic acid, β-benzoylacrylic acid, angelic acid, anisic acid, N-acetylanthranilic acid, arachidic acid, atropic acid, benzoic acid, o-bromobenzoic acid, p-cyanobenzoic acid, 2,6-dichlorobenzoic acid, 2,5-dinitrobenzoic acid, m-fluoro-benzoic acid, brassidic acid, dl-campholic acid, capric acid, cinnamic acid, cyclohexanecarboxylic acid, cyclopropanecarboxylic acid, formic acid, 3-furancarboxylic acid, trimethylsilylacetic acid, 5-nitro-2-furoic acid, 10-hendecenoic acid, isobutyric acid, lauric acid, levulinic acid, lignoceric acid, linoleic acid, oleic acid, stearic acid, tetrahydropyromucic acid, 3-ethylpentanoic acid and 2,4-xylic acid.

Polycarboxylic acids while not preferred can also be employed in preparing the amine salt catalyst of this invention. Examples of such acids include: adipic acid, azelaic acid, o-carboxymethoxybenzoic acid, 1-camphoric acid, 1,2-cyclobutanedicarboxylic acid, sym-bis-β-carboxyethyltetramethyldisiloxane, 1,2,3,4,5,6-cyclohexanehexacarboxylic acid, 1,3-cyclopentanedicarboxylic acid, diphenic acid, ethylmalonic acid, pimelic acid, sebacic acid, succinic acid and traumatic acid. It requires more carbon atoms in an amine salt of a polycarboxylic acid to render it compatible with an organosilicon compound operative in this invention than is the case with an amine salt of a monocarboxylic acid. For instance, in a given system n-hexylamine 2-ethylhexoate is very compatible and active whereas bis-eicosylamine succinate containing over three times as many carbon atoms is still less compatible and therefore less active. This problem can generally be somewhat alleviated by the use of silylorganic amine salts of these acids.

This problem of compatibility also arises with the amine salts of phosphoric acids which are also operative as catalysts in this invention. The salt can be prepared with phosphoric acid or with any acid esters of phosphoric acid such as monovalent hydrocarbon substituted phosphoric acids, e.g. phenylphosphoric, monooctadecylphosphoric or diethylphosphoric acids. An organic amine salt of phosphoric acid must contain at least about 18 carbon atoms to make it sufficiently compatible in a diorganopolysiloxane to be active whereas a silylorganic amine salt may not require so much carbon to render the catalyst compatible depending on the solubility characteristics of the system.

The amine-type salts are prepared by reacting ammonia, an organic amine or an aminoorganosilicon compound with a phosphoric or carboxylic acid. This can be accomplished by merely mixing the components alone in a relatively anhydrous system or by mixing the components together in a common solvent. This preparation is well known.

The amine-type salts can be normal, acidic or basic. The normal salts are those in which there are no unreacted amine or acid groups present as, for example, in

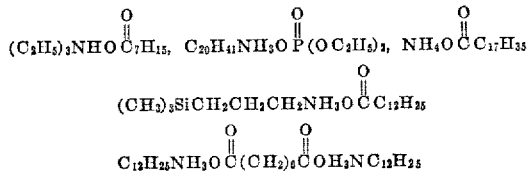

and

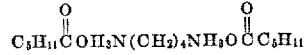

Actually, the normal salts, will often be acidic or basic depending on the relative basic and acidic characters of the amine and acid used to form the salt. This acidity or basicity can be balanced by adding an excess of the necessary amine or acid. The acidic salts are those in which there are unreacted acid groups present as, for example, in

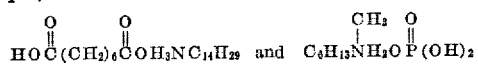

The basic salts are those in which there are unreacted amino groups present, as for example, in

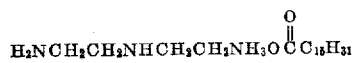

Further examples of amine salts operative as catalysts in this invention include: di-2-ethylhexylamine acetate, triphenylsilpropylamine formate, trimethylsiloxydimethylsilhexylamine hexoate, 4,4' - diaminobenzophenone butyrate, 4,4'-diamino diphenyl ether decanoate, tri-n-butylamine acrylate, 3,4-dichloroaniline caproate, aniline octanoate, didodecylamine o-chlorophenoxyacetate, ethyl-amine 3-ethoxypropionate, diethylene triamine monooleate, diisopropylamine palmitate, trimethylamine stearate, benzylhydrazine hexoate, 2,5-dimethylpiperazine octoate, di(octadecylamine) sebacate, ethylenediamine di-hexoate, tetraethylene pentamine di-phosphate, 1,2-aminopropane phenylphosphate and ammonium stearate together with the salts of any other of the amines and acids shown above. These examples are by no means complete, but they do illustrate some of the types of amine-type salts which can be used. These salts can be prepared prior to their inclusion in the condensation system, or they can be prepared in situ. For in situ preparation the order of addition of the acid and amine to the system is not critical.

It should be emphasized that the invention herein does not reside in the amine-type salts, which are generally well known as a class, but in the use of these salts as catalysts for the cocondensation of silicon-bonded hydroxyl groups and silicon-bonded —OR' radicals.

The rate of cure accomplished by this invention depends on the concentration of SiOR' groups and SiOH groups in the system and on the concentration of the amine salt. In other words, the number of functional groups per molecule, the number of molecules of the organosilicon composition present in the system and the amount of the amine salt in the system all affect the rate of cure of the resin. In order to reduce the number of variables in a given system it is preferable as stated above to employ a two-component organosilicon composition in which the organopolysiloxane component has essentially only SiOH groups and the silicate component has essentially only SiOR' groups. It is preferable that there be at least about one molecule of the silicate component per silicon-bonded hydroxyl group in the organopolysiloxane component. It is preferable, also, that no more than 50 parts of the silicate component per 100 parts of the organopolysiloxane component be present in the system in order to better control the rate of cure and the ultimate product.

As catalysts the amount of the amine salts which must be present to cause satisfactory cocondensation is not critical since even an infinitesimal amount of such salt will catalyze the reaction to a degree. However, the rate of condensation generally increases with an increase in catalyst concentration. Preferably there should be at least 0.01 percent by weight salt based on the weight of the organosilicon compound to be condensed. An optimum rate of condensation can be achieved in any system with less than 10 percent by weight salt. The best range runs from 0.1 to 5.0 percent by weight of the amine salt.

The temperature and pressure of the system are not critical but affect the rate of condensation. Generally, the rate increases as the temperature increases and the pressure decreases.

The materials employed in this invention are either well known in the art or are easily producible by means disclosed by reference or already well known in the art. While the actual proportions of ingredients are not considered critical, it is necessary that both the organosilicon composition and the amine salt be present together to produce a curing system. Where the three component system, i.e. organopolysiloxane, silicate and amine salt is employed, the silicate and siloxane or silicate and amine salt can be stored as combinations without appreciable change. When all three components are mixed together curing starts to take place spontaneously at room temperature. This mixture can be in solvent solution.

The method of this invention is useful for the polymerization of linear polymers in the preparation of rubber-grade gums and for the curing of silicone elastomers and resins. This method is operative in the presence of organic solvents such as toluene, without rearrangement of the siloxane units.

This invention produces compositions which when employed as thin film coatings can cure to dry films on wooden, metal, glass, ceramic, and the like surfaces within 24 hours at room temperature in air. Application can be by brushing, spraying or dipping. The first manifestation is surface gelation followed by a hardening within the film. It is to be understood that a base member can be coated with the complete mixture or with some of the mixture components which are subsequently activated by introduction of the third component as by spraying a silicate, amine salt or resin solution on a pretreated base member. The compositions prepared by the method of this invention also are useful as caulking compounds.

Additives common to other organosilicon systems can also be included in the mixture employed in this invention. Generally, such additives as pigments, heat stability additives and sun-screening agents are incorporated into the organosilicon compound but they can also be added separately or with the amine salt.

The following examples are merely illustrative of the method of this invention. These examples are not intended to limit the scope of this invention which is properly delineated in the claims. All viscosity measurements were made at 25° C. All quantities are measured as parts by weight. In these examples except where otherwise noted the term "EPS" designates an ethylpolysilicate having a viscosity of 12.2 cs. and containing 21.6 percent by weight silicon and 64.8 percent by weight ethoxyl radicals.

EXAMPLE 1

The following amine salts were prepared by mixing together the appropriate amines and acids in the proportions corresponding to the mol ratios of each component in the final salt. Where one component was solid at room temperature as in the case of myristic acid, the mixture was heated until the system was entirely liquid. There was an exothermic reaction in every case.

*A Primary Monoamine and Monoacid* n-Hexylamine 2-ethylhexoate
Isobutylamine oleate
t-Butylamine 2-ethylhexoate
t-Butylamine decanoate
t-Butylamine laurate
t-Butylamine myristate
t-Butylamine trimethyl-n-caproate
Cyclohexylamine 2-ethylhexoate
Cyclohexylamine decanoate
Cyclohexylamine laurate
Cyclohexylamine myristate
t-Octylamine 2-ethylhexoate
t-Octylamine decanoate
t-Octylamine laurate
t-Octylamine myristate
t-Octylamine trimethyl-n-caproate
t-Nonylamine 2-ethylhexoate
t-Nonylamine decanoate
t-Nonylamine laurate
t-Nonylamine myristate
t-Nonylamine trimethyl-n-caproate
Decylamine 2-ethylhexoate
Decylamine decanoate
Decylamine laurate
Decylamine myristate
Tridecylamine 2-ethylhexoate
Tridecylamine decanoate
Tridecylamine laurate
Tridecylamine myristate
Tridecylamine trimethyl-n-caproate
Eicosylamine 2-ethylhexoate
Eicosylamine decanoate
Eicosylamine laurate
Eicosylamine myristate
Eicosylamine trimethyl-n-caproate Ammonium oleate
Ammonium stearate
t-Butylamine acetate
t-Butylamine 2,2-dimethylpropanoate
n-Hexylamine formate
n-Hexylamine acetate
n-Hexylamine hexoate
Aniline 2-ethylhexoate

*B Primary Diamine+Monoacid*

Menthanediamine 2-ethylhexoate (mono salt)
Menthanediamine decanoate (mono salt)
Menthanediamine laurate (mono salt)
Menthanediamine myristate (mono salt)

*C Mono-Secondary Amine+Monoacid*

Tridecyldodecenylamine[($C_{13}H_{27}$)($C_{12}H_{23}$)NH]-2-ethylhexoate
Tridecyldodecenylamine decanoate
Tridecyldodecenynamine laurate
Tridecyldodecenylamine myristate
Tridecyldodecylamine 2-ethylhexoate
Tridecyldodecylamine decanoate
Tridecyldodecylamine laurate
Tridecyldodecylamine myristate
Diisopropylamine 2-ethylhexoate
Diisopropylamine decanoate
Diisopropylamine laurate
Diisopropylamine myristate
Dibenzylamine 2-ethylhexoate
Dibenzylamine decanoate
Dibenzylamine laurate
Dibenzylamine myristate
Di-n-hexylamine acetate
Di-n-hexylamine 2-ethylhexoate
Di-n-hexylamine formate
Di-n-hexylamine hexoate
Di-n-hexylamine benzoate

*D Mono-Tertiary Amine+Monoacid*

Triethylamine 2-ethylhexoate
Triethylamine decanoate
Triethylamine laurate
Triethylamine myristate
N,N-dimethyldodecylamine 2-ethylhexoate
N,N-dimethyldodecylamine decanoate
N,N-dimethyldodecylamine laurate
N,N-dimethyldodecylamine myristate
Triisoamylamine 2-ethylhexoate
Triisoamylamine decanoate
Triisoamylamine laurate
Triisoamylamine myristate
Tri-n-hexylamine 2-ethylhexoate

*E Di-Tertiary Amine+Monoacid*

Tetramethylethylenediamine 2-ethylhexoate (mono salt)
Tetramethylethylenediamine decanoate (mono salt)
Tetramethylethylenediamine laurate (mono salt)
Tetramethylethylenediamine myristrate (mono salt)
Tetramethylguanidine 2-ethylhexoate

*F Mono-Primary Amine+Polyacid*

(1) Monohexylamine phosphate monoeicosylamine phosphate
(2) Bishexylamine phosphate biseicosylamine phosphate
(3) Trishexylamine phosphate triseicosylamine phosphate
(4) Bis-eicosylamine succinate

EXAMPLE 2

20 parts of a polymer of the formula $$HO[Si(CH_3)_2O]_xH$$

having a viscosity of 2000 cs. (M.W.≅21,700, 1.5 parts of EPS and 0.05 part of n-hexylamine 2-ethylhexoate were mixed together. The mixture gelled in about 30 minutes and cured within 24 hours to a rubbery solid at room temperature.

EXAMPLE 3

When 20 parts of each of the following organopolysiloxanes are mixed with 1 part of EPS and 0.5 part of n-hexylamine 2-ethylhexoate, thin films of the resulting compositions air-dry at room temperature within 24 hours to form hard coatings.

As a 60% by weight solution in toluene a copolymer of 68 mol percent monomethylsiloxane units and 32 mol percent monophenylsiloxane units and containing 0.2% by weight silicon-bonded hydroxyl groups.

As a 50% by weight solution in toluene a copolymer of 35 mol percent phenylmethylsiloxane units, 10 mol percent dimethylsiloxane units, 25 mol percent monomethylsiloxane units and 30 mol percent monophenylsiloxane units and containing approximately 8% by weight silicon-bonded hydroxyl groups.

As a 50% by weight solution in xylene a copolymer of 31.4 mol percent phenylmethylsiloxane units, 34.0 mol percent monomethylsiloxane units and 34.6 mol percent monophenylsiloxane units and containing 0.75% by weight silicon-bonded hydroxyl groups.

As a 75% by weight solution in toluene a mixture of (1) 50% by weight of a copolymer of 75 mol percent monomethylsiloxane units, 24 mol percent dimethylsiloxane units and 1 mol percent trimethylsiloxane units and containing 0.4% by weight silicon-bonded hydroxyl groups and (2) 50% by weight of a copolymer of 25 mol percent monomethylsiloxane units, 35 mol percent monophenylsiloxane units, 20 mol percent dimethylsiloxane units and 20 mol percent diphenylsiloxane units and containing 4.8% by weight silicon-bonded hydroxyl groups.

As a 60% by weight solution in xylene a copolymer of 22 mol percent isopropylvinylsiloxane units, 30 mol percent monophenylsiloxane units, 5 mol percent monohexylsiloxane units, 1 mol percent monooctadecylsiloxane units, 1 mol percent monocyclopentylsiloxane units, 1 mol percent monobenzylsiloxane units and 40 mol percent diethylsiloxane units and containing 2.0% by weight silicon bonded hydroxyl groups.

As a 50% by weight solution in xylene a copolymer of 85 mol percent monophenylsiloxane units, 10 mol percent dimethylsiloxane units and 5 mol percent diphenylsiloxane units and containing 3.5% by weight silicon-bonded hydroxyl groups.

EXAMPLE 4

When 1 gram of n-hexylamine 2-ethylhexoate is mixed with 40 grams of a 50% by weight solution in xylene of an organopolysiloxane copolymer of 35 mol percent phenylmethylsiloxane units, 10 mol percent dimethylsiloxane units, 25 mol percent monomethylsiloxane units and 30 mol percent monophenylsiloxane units and containing 3% by weight silicon-bonded hydroxyl groups and 4% by weight silicon-bonded ethoxyl groups, the resulting composition will air-dry at room temperature to a tack-free gel within 24 hours when applied as a coating to a cedar panel.

EXAMPLE 5

When 20 parts of each of the following organopolysiloxanes are mixed with 1 part of EPS and 0.5 part of n-hexylamine 2-ethylhexoate, thin films of the resulting compositions air-dry at room temperature within 24 hours to form rubbery coatings.

A hydroxy-endblocked dimethylpolysiloxane having a viscosity of 10,720 cps. (M.W.≅39,000).

A hydroxy-endblocked 3,3,3-trifluoropropylmethylpolysiloxane having a viscosity of 450 cs.

A hydroxy-endblocked 5,000 cs. copolymer of 50 mol percent dimethylsiloxane units, 45 mol percent phenylmethylsiloxane units, 3 mol percent perchlorophenylmethylsiloxane units, 1 mol percent cyclohexylbenzylsiloxane units and 1 mol percent dicresylsiloxane units.

EXAMPLE 6

When each of the following organosilicon compositions in the amounts shown is mixed with 5 grams of n-hexylamine 2-ethylhexoate and 167 grams of a 60% solution in xylene of a resin copolymer of 35 mol percent phenylmethylsiloxane units, 10 mol percent dimethylsiloxane units, 25 mol percent monomethylsiloxane units and 30 mol percent monophenylsiloxane units, said copolymer containing 3 to 4% by weight silicon-bonded hydroxyl groups, the resulting compositions air-dry to a tack-free gel in less than 24 hours at room temperature when applied as coatings to wooden panels.

0.5 gram $Si[O(CH_2CH_2O)_2C_2H_5]_4$
2 grams $Si(OC_5H_{11})_4$
1.5 grams $Si(OCH_2-CH=CH_2)_4$
3 grams $Si(OCH_2CH_2OCH=CH_2)_4$
3 grams $Si(OC_6H_{11})_4$
2 grams $Si(OCH_3)_3(OC_6H_4Cl)$
6 grams $Si[OC_6H_3(CH_3)OH]_4$
8 grams $Si(OCH_2C_2F_5)_4$
5 grams $(CF_3CH_2O)_3SiOSi(OCH_2CF_3)_3$
4 grams $(C_3H_7O)_3SiO[Si(OC_3H_7)_2O]_3OSi(OC_3H_7)_3$
0.2 gram $[(CH_3OCH_2CH_2O)_3Si]_2O$
4 grams $PhSi(OCH_2CH_2OCH_3)_3$ 4 grams $CH_2=C-CH_2Si(OCH_2CH_2OCH_3)_3$ with $CH_3$ on the central carbon 6 grams $C_5H_9Si(OCH_3)_3$
4 grams $CF_3CH_2CH_2Si(OCH_2CH_2OCH=CH_2)_3$
4 grams $Cl-C_6H_4-Si(OCH_2CH=CH_2)_3$ 4 grams $CH_2CH_2OCH_2CHSi(OCH_2CH_2OC_2H_5)_3$ (cyclic)

4 grams $CH_3CHOHCH_2OCH_2$
$CHOHCH_2OCH_2CH_2Si(OCH_2CH_2OCH_3)_3$ 4 grams $CH_3Si(OC_2H_5)_2O[Si(OC_4H_9)_2O]_3$
$[Si(C_6H_5)(OC_2H_5)O]_2Si(OC_3H_7)_3$ 4 grams $[Si(OC_2H_5)_2O]_4$

EXAMPLE 7

When 0.02 gram-moles of each of the amine salts prepared in Example 1 are mixed with 167 grams of the resin-in-xylene solution employed in Example 6 and 5 grams of EPS, the resulting compositions air-dry to a tack-free gel in less than 24 hours at room temperature when applied as coatings to wooden panels.

EXAMPLE 8

When 0.02 gram-moles of the following amine salts are substituted for the amine salts employed in Example 7, similar tack-free coatings result.

$(C_6H_5)_2(CH_3)SiOSi(C_6H_5)_2CH_2CH_2CH_2NH_2O\overset{O}{\underset{\|}{C}}C_5H_{11}$ $(CH_3)_3SiCH_2CH_2CH_2NHCH_2CH_2NH_2O\overset{O}{\underset{\|}{C}}C_7H_{15}$ and $(CH_3)(C_2H_5)(C_6H_5)Si(CH_3)_3NH_2O\overset{O}{\underset{\|}{C}}C_7H_{15}$
$|$
$CH_2CH_2NH_2O\overset{O}{\underset{\|}{C}}C_7H_{15}$

EXAMPLE 9

When the following hydroxyl-endblocked organosilicon compounds are each mixed with approximately 2 percent by weight of n-hexylamine 2-ethylhexoate and 8 percent by weight of EPS based on the weight of the organosilicon compound, each of the resulting compositions cures to a tack-free gel within 24 hours at room temperature.

$(HO)_3SiO[Si(C_6H_5)(CH_3)O]_2Si(C_6H_5)(CH_3)OH$ $HOSi(CH_3)(C_2H_3)O[Si(CH_3)_2O]_{80}[Si(CH_3)$
$(CH_2CH_2CN)O]Si(CH_3)(C_2H_3)OH$ $CF_3CH_2CH_2Si(CH_3)(OH)_2$

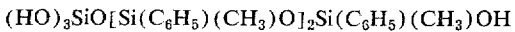

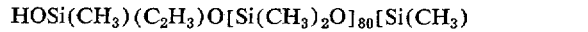
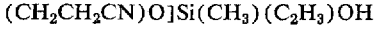

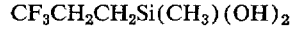

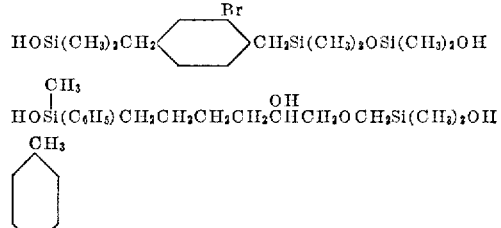

That which is claimed is:

1. The method which comprises contacting (A) an organosilicon compound containing as functional groups both silicon-bonded hydroxyl radicals and silicon-bonded —OR' radicals, each R' radical being a monovalent radical selected from the group consisting of hydrocarbon radicals and hydrocarbon radicals containing functions selected from the group consisting of ether linkages, aromatic halogen atoms, nitrile groups, hydroxyl groups and aliphatic fluorine atoms, the last being separated from any silicon atom by at least three atoms, there being less than eleven total carbon atoms and ethereal oxygen atoms in each R', the remaining silicon valences in said organosilicon compound being satisfied by radicals selected from the group consisting of silicon-bonded oxygen atoms, hydrocarbon radicals and hydrocarbon radicals containing functions selected from the group consisting of ether linkages, aromatic halogen atoms, nitrile groups, hydroxyl groups and aliphatic fluorine atoms, the last being separated from any silicon atom by at least three atoms, with (B) a composition compatible with (A) and selected from the group consisting of (1) a salt of a phosphoric acid, the only active hydrogen atoms in said acid being attached to the phosphorus through an oxygen atom, and a basic amino compound, any active hydrogen in said amino compound being attached to nitrogen and any remaining nitrogen valences being satisfied by carbon atoms, the total number of carbon atoms in (1) being at least 18, and (2) a salt of a carboxylic acid, the only active hydrogen in said carboxylic acid being a part of carboxyl groups attached only to carbon atoms, and a basic amino compound, any active hydrogen in said amino compound being attached to nitrogen and any remaining nitrogen valences being satisfied by carbon atoms, the total number of carbon atoms in (2) being at least 6, whereby the silicon-bonded hydroxyl radicals in (A) condense with the silicon-bonded —OR' radicals in (A) to form siloxane linkages producing HOR' as a by-product.

2. A method comprising mixing together (1) an organopolysiloxane containing an average of at least one silicon-bonded hydroxyl group per molecule and from 1.0 to 3.0 monovalent hydrocarbon radicals per silicon atom, (2) at least .01 part per 100 parts of (1) of an organosilicon composition consisting essentially of units of the formula $$(R'O)_mSiO_{\frac{4-m}{2}}$$

in which each R' is a monovalent hydrocarbon radical of less than eleven carbon atoms and each m has a value ranging from 2 to 4 and (3) at least .01 part per 100 parts of (1) of a salt of a carboxylic acid, the only active hydrogen in said carboxylic acid being a part of carboxyl groups attached only to carbon atoms, and a basic amino compound, any active hydrogen in said amino compound being attached to nitrogen and any remaining nitrogen valences being satisfied by carbon atoms, the total number of carbon atoms in (3) being at least 6, whereby the silicon-bonded hydroxyl radicals in (1) condense with the silicon-bonded —OR' radicals in (2) to form siloxane linkages producing HOR' as a by-product.

3. A method comprising mixing together (1) an organopolysiloxane having an average of at least one silicon-bonded hydroxyl group per molecule and from 1.0 to 3.0 monovalent hydrocarbon radicals per silicon atom, (2) at least .01 part per 100 parts of (1) of an organosilicon composition consisting essentially of units of the formula

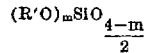

in which each R' is a monovalent hydrocarbon ether radical containing less than eleven total carbon and oxygen atoms, end each $m$ has a value ranging from 2 to 4 and (3) at least .01 part per 100 parts of (1) of a salt of a carboxylic acid, the only active hydrogen in said carboxylic acid being a part of carboxyl groups attached only to carbon atoms, and a basic amino compound, any active hydrogen in said amino compound being attached to nitrogen and any remaining nitrogen valences being satisfied by carbon atoms, the total number of carbon atoms in (3) being at least 6, whereby the silicon-bonded hydroxyl radicals in (1) condense with the silicon-bonded —OR' radicals in (2) to form siloxane linkages producing HOR' as a by-product.

4. A method comprising mixing together (1) an organopolysiloxane having an average of at least two silicon-bonded hydroxyl groups per molecule and from 1.0 to 1.9 methyl and phenyl radicals per silicon atom of which from 0.25 to 1.5 radicals per silicon atom are the phenyl radicals, (2) at least .01 part per 100 parts of (1) of an organosilicon composition consisting essentially of units of the formula

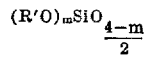

in which each R' is a monovalent hydrocarbon radical of less than eleven carbon atoms and each $m$ has a value ranging from 2 to 4 and (3) at least .01 part per 100 parts of (1) of a salt of a carboxylic acid, the only active hydrogen in said carboxylic acid being a part of carboxyl groups attached only to carbon atoms, and a basic amino compound, any active hydrogen in said amino compound being attached to nitrogen and any remaining nitrogen valences being satisfied by carbon atoms, the total number of carbon atoms in (3) being at least 6, and thereafter allowing the mixture to cure.

5. A method comprising mixing together (1) an organopolysiloxane having an average of at least two silicon-bonded hydroxyl groups per molecule and from 1.0 to 1.9 methyl and phenyl radicals per silicon atom of which from 0.25 to 1.5 radicals per silicon atom are the phenyl radicals, (2) at least .01 part per 100 parts of (1) of an organosilicon composition consisting essentially of units of the formula

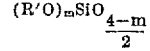

in which each R' is a monovalent ether radical of less than eleven total carbon and oxygen atoms, and each $m$ has a value ranging from 2 to 4 and (3) at least .01 part per 100 parts of (1) of a salt of a carboxylic acid, the only active hydrogen in said carboxylic acid being a part of carboxyl groups attached only to carbon atoms, and a basic amino compound, any active hydrogen in said amino compound being attached to nitrogen and any remaining nitrogen valences being satisfied by carbon atoms, the total umber of carbon atoms in (3) being at least 6, and thereafter allowing the mixture to cure.

6. The method of claim 2 in which organopolysiloxane (1) is essentially a diorganopolysiloxane.

7. The method of claim 3 in which organopolysiloxane (1) is essentially a diorganopolysiloxane.

References Cited in the file of this patent

UNITED STATES PATENTS

| | | |
|---|---|---|
| 2,715,133 | Speier | Aug. 9, 1955 |
| 2,902,467 | Chipman | Sept. 1, 1959 |
| 2,972,598 | Morehouse | Feb. 21, 1961 |

FOREIGN PATENTS

| | | |
|---|---|---|
| 216,878 | Australia | Aug. 29, 1958 |
| 202,354 | Austria | Mar. 10, 1959 |

UNITED STATES PATENT OFFICE
CERTIFICATE OF CORRECTION

Patent No. 3,094,497

June 18, 1963

James Franklin Hyde

It is hereby certified that error appears in the above numbered patent requiring correction and that the said Letters Patent should read as corrected below.

Column 1, line 61, for "the" read -- these --; column 3, line 21, for "HOSiR$_2$OSIR$_2$OH" read -- HOSiR$_2$OSiR$_2$OH --; column 4, line 27, for "R(R'O)$_2$SiO[SiR(OR')O]$_x$SIR(OR')$_2$" read -- R(R'O)$_2$SiO[SiR(OR')O]$_x$SiR(OR')$_2$ --; column 4, line 44, for "(R'O)$_3$SiO)[Si(OR')$_2$O]$_x$Si(OR')$_3$" read -- (R'O)$_3$SiO[Si(OR')$_2$O]$_x$Si(OR')$_3$ --;

column 5, line 21, for "4,4-di-" read -- 4,4'-di- --; line 40, for "atoms" read -- atom --; column 9, line 20, for "Tridecyldodecenynamine" read -- Tridecyldodecenylamine --; column 11, lines 32 and 33, the formula should appear as shown below instead of as in the patent:

same column 11, lines 62 and 63, the formula should appear as shown below instead of as in the patent:

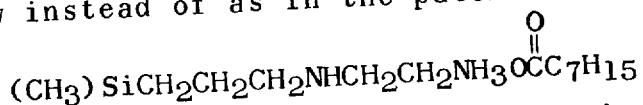

column 14, line 28, for "umber" read -- number --.

Signed and sealed this 15th day of September 1964.

(SEAL)
Attest:

ERNEST W. SWIDER
Attesting Officer

EDWARD J. BRENNER
Commissioner of Patents